UNITED STATES PATENT OFFICE.

HERMAN HEUSER, OF EVANSTON, ILLINOIS.

PROCESS OF PREPARING LOW-ALCOHOLIC BEVERAGES.

1,390,710.    Specification of Letters Patent.    Patented Sept. 13, 1921.

No Drawing.    Application filed June 16, 1920. Serial No. 389,388.

*To all whom it may concern:*

Be it known that I, HERMAN HEUSER, a citizen of the United States, residing at 929 Sheridan road, Evanston, in the county of Cook and State of Illinois, have invented a new and useful Improvement in the Processes of Preparing Low-Alcoholic Beverages, of which the following is a specification.

The present invention relates to the preparation of carbonated or effervescent low alcoholic beverages having the taste, flavor, body and other beverage characteristics of fermented alcoholic beverages such as beer, ale, stout, porter, etc. It will be fully understood from the following description thereof, in which an example embodying the process is set forth.

In preparing a beverage, for example, of a beer-like character, in accordance with the present invention, a beverage stock is prepared by dealcoholizing a suitable fermented alcoholic beverage material, for example, beer. This may suitably be effected by boiling the beer in the open air or *in vacuo* until substantially all of the alcohol has been eliminated. The water removed is replaced, the dealcoholized stock then showing an almost negligible alcohol content, say 0.05–0.07%.

In the further treatment of the beverage stock, the quality of the product may be impaired by infections and undesirable fermentations caused by bacteria and wild yeasts. In carrying out the further steps of preparing the beverage from the dealcoholized stock these deleterious infections and fermentations are to a substantial extent avoided by carrying out such further steps of the process substantially entirely in the presence of carbon dioxid *ab initio*. Thus the following procedure may be employed:

To 100 parts by volume of the dealcoholized stock, cooled to about 37° F., live yeast and fermentable matter is added, for example, 10 parts of beer wort pitched with 1 lb. of thick fluid yeast per barrel of wort. The wort may have, for example, an alcohol producing capacity of 3.50% upon its own volume and a $CO_2$-producing capacity of 2.63%. The stock with the added wort is then at once treated with $CO_2$ gas, which is preferably introduced into the entire quantity of liquid while the latter is stirred. Sufficient $CO_2$ is preferably introduced into the liquid to saturate it at atmospheric pressure or slightly thereabove, say at one or two pounds above atmospheric. The pressure may be secured by means of suitable valves upon the carbonating apparatus. The liquid may thus contain up to 0.28–0.30% $CO_2$.

When the liquid contains the desired $CO_2$ content it is stored under a bunging pressure of, say, 5 to 6 pounds and the fermentation of the added wort allowed to become completed, this requiring two or three weeks. Excess $CO_2$ blows off, and at the termination of the fermentation, the product may be filtered and bottled.

It is readily apparent that the dealcoholized stock may be treated with $CO_2$ before the addition thereto of the wort. It is further apparent that a less pressure than 5 or 6 lbs. may be applied during fermentation, whereby a lower proportion of $CO_2$ is retained in the beverage, growth and propagation of the yeast being thereby somewhat aided, and the additional $CO_2$ required for effervescence supplied artificially. The specific details of the example set forth are not intended to be regarded as limitations upon the scope of the invention except in so far as included in the accompanying claims.

I claim:

1. The process of preparing low alcoholic beverages having the characteristics of natural alcoholic fermentated beverages which consists in producing a limited yeast fermentation in dealcoholized beer while maintaining carbon dioxid in the liquid from a period prior to the beginning of said fermentation.

2. The process of preparing a low alcoholic beer-like beverage which consists in producing a limited yeast fermentation in dealcoholized beer while maintaining carbon dioxid in the liquid from a period prior to the beginning of fermentation.

3. The process of preparing a low-alcoholic beer-like beverage which consists in adding to dealcoholized beer 10% of beer wort containing yeast, saturating the liquid with $CO_2$ and causing the fermentation to proceed under a bunging pressure of 5 to 6 lbs.

4. The process of preparing a low-alcoholic beer-like beverage which consists in adding to dealcoholized beer 10% of beer wort containing active yeast, saturating the liquid with $CO_2$ at one to two pounds pressure, and causing the yeast fermentation to proceed in the presence of the $CO_2$.

HERMAN HEUSER.